United States Patent [19]

Ono

[11] 3,810,247

[45] May 7, 1974

[54] TELEPHONE SET CIRCUIT

[75] Inventor: Yasuhiro Ono, Niza, Japan

[73] Assignee: Iwasaki Tsushinki Kabushiki Kaisha, a/k/a Iwatsu Electric Co., Ltd., Tokyo-to, Japan

[22] Filed: Sept. 27, 1971

[21] Appl. No.: 184,121

[30] Foreign Application Priority Data

Sept. 30, 1970 Japan .................................. 45-85074

[52] U.S. Cl. .................................................. 179/81 R

[51] Int. Cl. ................................................. H04m 1/00

[58] Field of Search.. 179/81 A, 81 B, 81 R, 170 G, 179/16 F; 333/80, 18, 28, 73; 307/318

[56] References Cited

UNITED STATES PATENTS

| | | | |
|---|---|---|---|
| 3,548,111 | 12/1970 | Kleissl | 179/81 |
| 3,239,681 | 3/1966 | Bond | 307/318 |

FOREIGN PATENTS OR APPLICATIONS

| | | | |
|---|---|---|---|
| 655,774 | 8/1951 | Great Britain | 179/81 |

*Primary Examiner*—Kathleen H. Claffy
*Assistant Examiner*—Alan Faber
*Attorney, Agent, or Firm*—Robert E. Burns; Emmanuel J. Lobato

[57] ABSTRACT

A telephone set circuit having a talking circuit formed by a transmitter, a receiver, an induction coil and a balancing network. The induction coil serves to couple the receiver and the transmitter in conjugate relationship between a two-line subscriber's line and the balancing network. The balancing network includes a series-connected combination of a nonlinear resistance element and an ohmic resistance. A control circuit formed into a four terminal network is connected in cascade with terminals of the talking circuit. The control circuit is formed by use of an inductance element or an inductance circuit for compensating the capacitive component of the subscriber's line, to which the telephone set circuit is connected, and a nonlinear resistance element for controlling the value of the inductance element or the inductance circuit in accordance with the supplied direct current of the subscriber's line.

16 Claims, 10 Drawing Figures

TELEPHONE SET CIRCUIT

This invention relates to telephone set circuits having an equalizing circuit for obtaining uniform speech quality irrespective of different conditions of telephone circuits, such as subscriber's line losses and diameters of line conductors.

There has been heretofore proposed a system for controlling transmitting attenuation, receiving attenuation and side-tone attenuation in accordance with the intensity of a supplied direct current from an exchange and provided with, in parallel with or in series with the input terminals and terminals of the balancing network of a telephone circuit, a circuit comprising a non-linear resistance element, an ohmic resistance or resistances, and a capacitor or capacitors. However, since correlation between a line impedance and the intensity of the supplied direct current from an exchange is complicated, the side-tone attenuation remarkably affected by the line impedance is fluctuated in accordance with deviation of diameters of line conductors and of line losses. Accordingly, it is very difficult to obtain uniform and good speech quality by the conventional system.

Therefore, an object of this invention is to provide a telephone set circuit capable of obtaining uniform speech quality irrespective of different diameters and lengths of subscriber's lines.

In accordance with the principle of this invention, the capacitive component of a line impedance of a connected subscriber's line is reduced so as to substantially assume an effective resistance component only, so that the line impedance has close correlation against the intensity of the supplied direct current from an exchange.

The principle, construction and operations of this invention will be better understood from the following detailed discussion taken in conjunction with the accompanying drawings, in which the same or equivalent part are designated by the same reference numerals, characters and symbols, and in which.

Figure 1:
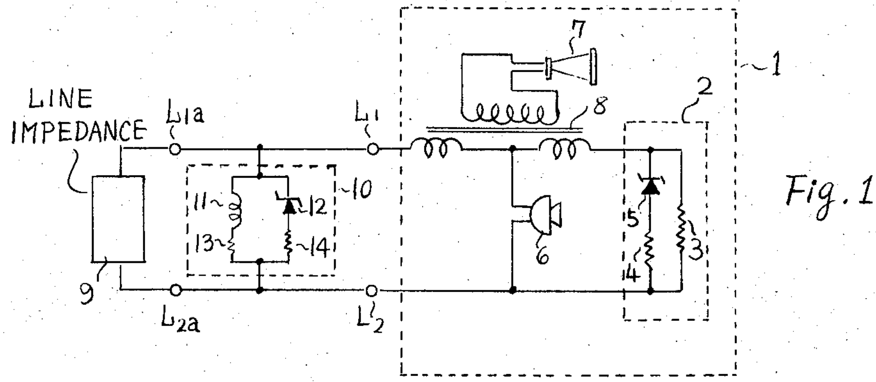
FIG. 1 is a connection diagram illustrating an embodiment of this invention.

With reference to FIG. 1, an example of a telephone set circuit of this invention comprises a talking circuit 1 and a control circuit 10. The talking circuit 1 comprises a balancing network 2, a transmitter 6, a receiver 7, and an induction coil 8 which are combined so as to form an antiside tone circuit. The induction coil 8 serves to couple the receiver 7 and the transmitter 6 in conjugate relationship between a two-line subscriber's line ($L_1$, $L_2$) and the balancing network. In this example, an antiside tone circuit of bridge circuit type is employed. However, an antiside tone circuit of booster circuit type may be employed. The balancing network 2 comprises an ohmic resistance 3 and a series-connected combination of an ohmic resistance 4 and a nonlinear element 5, such as a zener diode. The control circuit 10 is a four terminal network, having a first pair of terminals $L_{1a}$ and $L_{2a}$ and a second pair of terminals $L_1$ and $L_2$ common to the input terminals of the talking circuit 1, and comprising first means including a first series-connected combination of inductance means comprising an inductance element 11 and an ohmic resistor 13 and second means including a second series-connected combination of non-linear resistance means comprising a non-linear element 12, such as a zener diode, and an ohmic resistor 14. The first series-connected combination and the second series-connected combination are connected in parallel with each other. The control circuit 10 is connected in cascade between the line impedance 9 and the talking circuit 1.

In the telephone set network of this invention, a terminal voltage of the zener diode 12 is varied in accordance with fluctuation of the supplied direct current from the exchange, so that the zener diode 12 assumes a high impedance against a long subscriber's line, in which the subscriber's line impedance 9 has a large capacitance, or a low impedance against a short subscriber's line, in which the subscriber's line impedance 9 has a small capacitance. Accordingly, an impedance viewed from the terminals $L_1$ and $L_2$ to the subscriber's line assumes a small phase angle, so that a sufficient side-tone attenuation can be obtained by employing the above mentioned balancing network 2 using the resistance 3 and 4 and the zener diode 5. If the values of the inductance element 11 and the resistance 13 are sufficiently larger than the subscriber's line impedance 9, the insertion loss of the control circuit 10 is small against a long subscriber's line or large against a short subscriber's line due to the small impedance of the zener diode 12. Accordingly, nonuniformity of the transmitting attenuation and of the receiving attenuation caused by deviation of line losses can be improved, so that excellent speech quality can be obtained.

Figure 2:
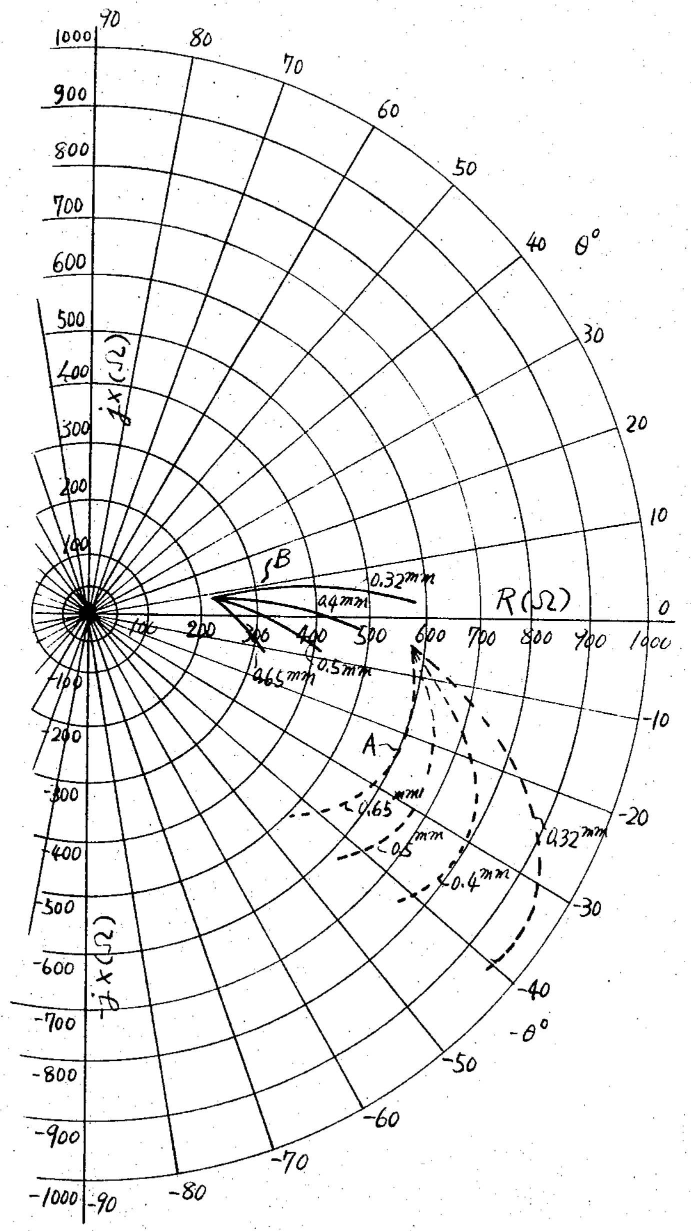
FIGS. 2, 3A, 3B and 3C are characteristic diagrams explanatory of electrical characteristics of a telephone set circuit of this invention and a conventional telephone set circuit.

In FIG. 2, electronic characteristics of line impedances at a frequency 2,000 Hz are shown with respect to the diameters in millimeter (mm) of line conductors and line losses in Ohm (Ω) as variables. The ordinate is the imaginary part (jx) of the line impedance, while the abscissa is the real part (R) of the line impedance. Dotted lines A are impedance curves viewed from input terminals ($L_1$ and $L_2$) of a conventional telephone set circuit to a subscriber's line, while solid lines B are impedance curves viewed from the input terminals $L_1$ and $L_2$ of the talking circuit 1 of the telephone set circuit of this invention to a subscriber's line including the control circuit 10.

Figure 3A:
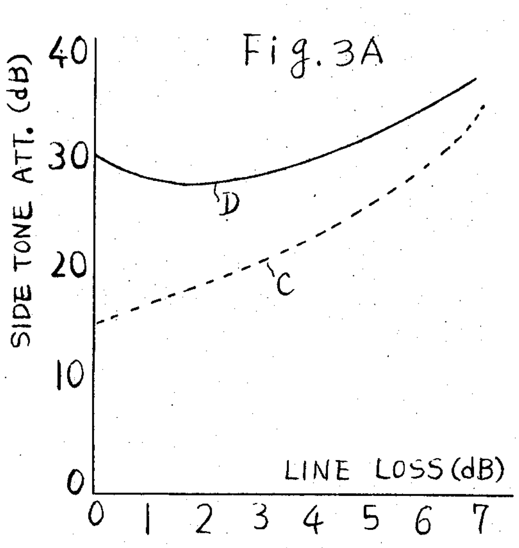
Figure 3B:
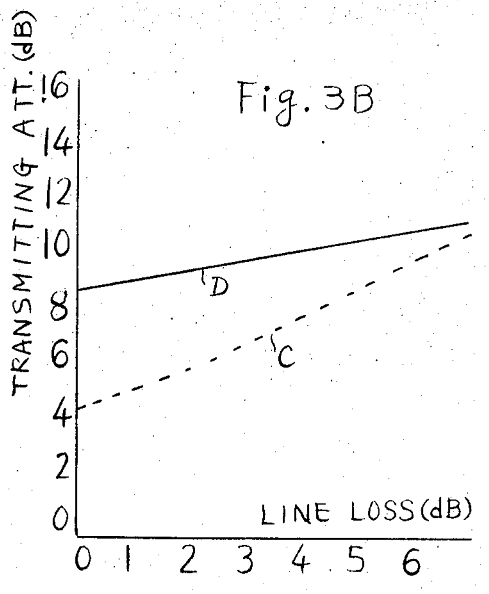
Figure 3C:
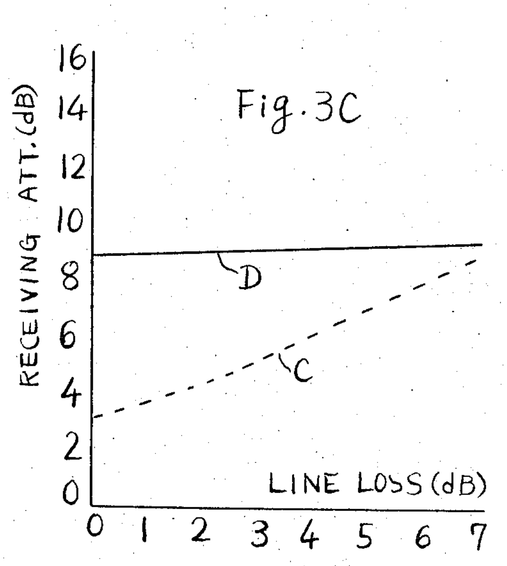

In FIGS. 3A, 3B and 3C, side-tone attenuation curves, transmitting attenuation curves and receiving attenuation curves at a frequency 2,000 Hz are respectively shown for a kind of subscriber's line with respect to the subscriber's line loss as a variable. Dotted curves C are characteristic curves for a conventional telephone set circuit, while solid lines D are characteristic curves for a telephone set circuit of this invention.

As understood from the above characteristics shown in FIGS. 2, 3A, 3B and 3C, uniform speech quality can be maintained in accordance with this invention even if the diameters of subscriber's line conductors and the line loss of a subscriber's line are deviated.

Figure 4:
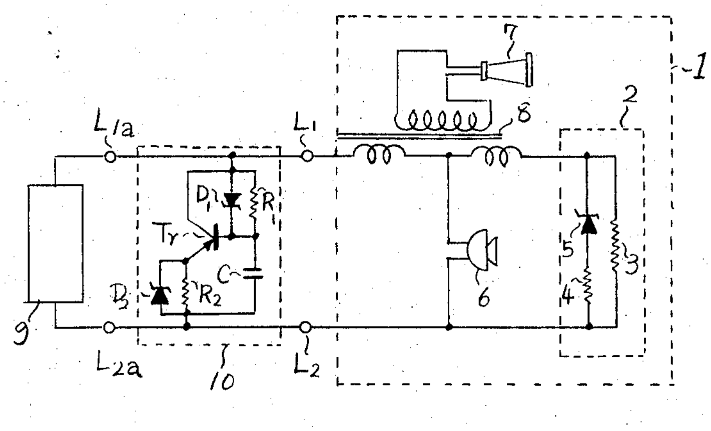
FIG. 4 is a connection diagram illustrating another embodiment of this invention.

With reference to FIG. 4, another example of a telephone set circuit of this invention comprises a control circuit 10 formed by a transistor Tr, zener diodes $D_1$ and $D_2$, ohmic resistances $R_1$ and $R_2$ and a capacitor C.

In this example, an inductance component is formed by a transistor Tr, the ohmic resistances $R_1$ and $R_2$, and the capacitor C. The value of the inductance component is controlled by the zener diodes $D_1$ and $D_2$ in accordance with a supplied direct current from an exchange.

Figure 5A:
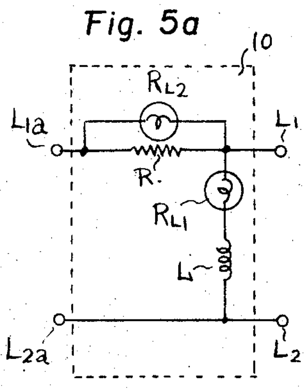
FIGS. 5A, 5B, 6A and 6B are connection diagram each illustrating another examples of a control circuit used in this invention.
Figure 5B:
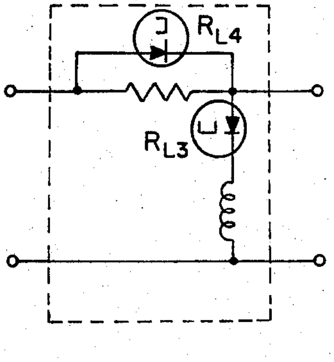

With reference to FIG. 5, another example of the control circuit 10 of a telephone set circuit of this invention comprises a parallel-connected combination of a negative non-linear resistance element $RL_2$ or $RL_4$ (e.g.; a thermistor or a tunnel diode) and an ohmic resistance R and a series-connected combination of a negative non-linear resistance element $RL_1$ or $RL_3$ and an inductance element L. The parallel-connected combination is connected in series between terminals $L_{1a}$ and $L_1$, while the series-connected combination is connected in parallel across terminals $L_1$ and $L_2$. Respective resistances of the negative non-linear resistance elements $RL_1$ and $RL_2$ become small against a long subscriber's line having a small supplied direct current, so that the inductance element is effectively inserted across the terminals $L_1$ and $L_2$. On the other hand, since respective resistances of the negative non-linear resistance elements $RL_1$ and $RL_2$ become large against a short subscriber's line having a large supplied direct current, only the resistance R is inserted between the terminals $L_{1a}$ and $L_1$.

Figure 6A:
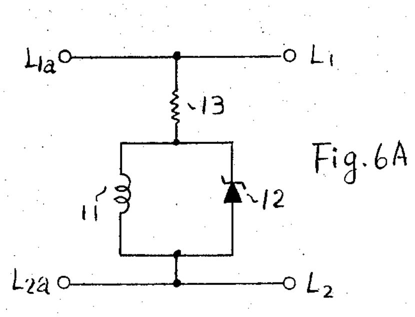
Figure 6B:
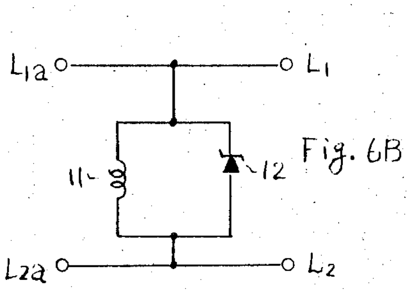

The control circuit 10 can be modified as shown in FIG. 6A and FIG. 6B. The control circuit shown in FIG. 6A is a series-connected combination of a resistance 13 and a parallel-connected combination of an inductance element 11 and a zener diode 12. The control circuit shown in FIG. 6B is a parallel-connected combination of an inductance element 11 and a zener diode 12.

In each of the above mentioned control circuits 10, an impedance element 11 or an impedance component is employed as impedance means to compensate a capacitive component of a subscriber's line, while a nonlinear resistance element (e.g.; a zener diode) 12 is employed to control the value of the impedance means in accordance with a supplied direct current from an exchange.

As mentioned above, correlation between the line impedance of a subscriber's line and a supplied direct current from an exchange becomes close by the use of a telephone set circuit of this invention. Accordingly, the side-tone attenuation can be readily maintained at a stable value as well as the transmitting attenuation and the receiving attenuation. Moreover, since an internal resistance of a telephone set circuit becomes small in accordance with this invention, a telephone set circuit for individual service can be commonly used for the provate branch exchange (P.B.X.) and the party line service.

What I claim is:

1. A telephone set circuit, comprising:

a two line subscriber's line having an impedance characteristic having a capacitive component; a talking circuit comprising a transmitter, a receiver, a balancing network comprising a series-connected combination of a nonlinear resistance element and an ohmic resistance element, and an induction coil coupling said transmitter and said receiver in conjugate relationship between said two-line subscriber's line and said balancing network; and a control circuit comprising a four terminal network connected in parallel with said talking circuit and said two-line subscriber's line, said control circuit comprising first means including inductance means for compensating the capacitive component of said subscriber's line, and second means including a nonlinear resistance element for controlling the value of the inductance means in accordance with the supplied direct current through said subscriber's line.

2. A telephone set circuit according to claim 1, wherein said inductance means comprises an inductance element connected across said two-line subscriber's line and wherein said nonlinear resistance element comprises a zener diode connected in parallel with said inductance element.

3. A telephone set circuit according to claim 2, wherein said control circuit further comprises an ohmic resistance element connected in series between the parallel circuit of said inductance element and said zener diode and one line of the subscriber's line.

4. A telephone set circuit according to claim 2, wherein said control circuit further comprises two ohmic resistance elements respectively inserted in series between said inductance element and said zener diode and one line of the subscriber's line.

5. A telephone set circuit according to claim 1, wherein said first means includes a transistor, a first ohmic resistance element connected across the base and the collector of said transistor and to one line of the subscriber's line, a second ohmic resistance element one terminal of which is connected to the emitter of said transistor and the other terminal to the other line of the subscriber's line, and a capacitor connected across the base of said transistor and said other terminal of the second ohmic resistance element, and wherein said second means comprises a first zener diode connected in parallel with said first resistance element, and a second zener diode connected in parallel with said second ohmic resistance element.

6. A telephone set circuit according to claim 1, wherein said second means comprises an ohmic resistance element and a first nonlinear negative resistance element connected in parallel and both elements connected between one of a pair of terminals of said four terminal network and one of the other pair of terminals of said four terminal network, and wherein said first means comprises an inductance element and a second nonlinear negative resistance element connected in series and both elements connected across one pair of the two pairs of terminals of said four terminal network.

7. A telephone set circuit according to claim 6, wherein at least one of said first and second nonlinear negative resistance elements comprises a thermistor.

8. A telephone set circuit according to claim 6, wherein at least one of said first and second nonlinear negative resistance element comprises a tunnel diode.

9. In a telephone system comprising a telephone circuit for transmitting and receiving information utilizing a two-line transmission line having an impedance characteristic wherein the magnitude of the impedance and the magnitude of the capacitive component of said impedance are dependent upon the physical properties of said transmission line; a control circuit connected in parallel between said telephone circuit and said transmission line for controlling the transmission and receiving attenuation characteristics of said telephone circuit, said control circuit comprising first means including inductance means for compensating for said capacitive component to impart a substantially resistive impedance to said transmission line, and second means including nonlinear resistance means for controlling the magnitude of said substantially resistive impedance of said transmission line; whereby said control circuit imparts to said telephone circuit a minimized variance in said transmission and receiving attenuation characteristics for an operable range of physical properties of said transmission line.

10. In a telephone system according to claim 9, wherein said inductance means includes an inductor connected across said two-line transmission line and wherein said nonlinear resistance means includes a zener diode connected in parallel with said inductor.

11. In a telephone system according to claim 10, wherein said control circuit further comprises a resistor connected in series between the parallel combination of said inductor and said zener diode and one line of said two-line transmission line.

12. In a telephone system according to claim 10, wherein said control circuit further comprises a resistor connected in series between said zener diode and one line of said transmission line and a resistor connected in series between said inductior and said one line of said transmission line.

13. In a telephone system according to claim 9, wherein said first means includes a transistor having a collector connected to one line of said transmission line, a first resistor connected across the base and the collector of said transistor, a second resistor having one end connected to the emitter of said transistor and the other end connected to the other line of said transmission line, a capacitor connected across said base of said transistor and said other end of said second resistor, and wherein said second means comprises a first zener diode connected in parallel with said first resistor and a second zener diode connected across said second resistor.

14. In a telephone system according to claim 9, wherein said second means include a resistor, a first nonlinear negative resistance element connected in parallel with said resistor, the parallel combination connected in series with one line of said transmission line, and wherein said first means includes an inductor and a second nonlinear negative resistance element connected in series with said inductor, the series combination connected across said transmission line.

15. In a telephone system according to claim 14, wherein at least one of said first and said nonlinear negative resistance elements comprise a thermistor.

16. In a telephone system according to claim 14, wherein at least one of said first and second nonlinear negative resistance elements comprise a tunnel diode.

* * * * *